US012561298B2

(12) United States Patent
Abdelaal et al.

(10) Patent No.: US 12,561,298 B2
(45) Date of Patent: Feb. 24, 2026

(54) MACHINE LEARNING ORIENTED INTERACTIVE TABULAR DATA QUALITY DISPLAY SYSTEMS AND METHODS

(71) Applicant: SOFTWARE GMBH, Darmstadt (DE)

(72) Inventors: Mohamed Abdelaal, Stuttgart (DE);
Samuel Lokadjaja, Darmstadt (ID);
Arne Kreuz, Saarbrücken (DE)

(73) Assignee: SOFTWARE GMBH, Darmstadt (DE)

( * ) Notice: Subject to any disclaimer, the term of this patent is extended or adjusted under 35 U.S.C. 154(b) by 0 days.

(21) Appl. No.: 18/658,237

(22) Filed: May 8, 2024

(65) Prior Publication Data

US 2025/0348470 A1     Nov. 13, 2025

(51) Int. Cl.
G06F 16/00          (2019.01)
G06F 16/215          (2019.01)
G06F 16/23          (2019.01)

(52) U.S. Cl.
CPC ........ G06F 16/215 (2019.01); G06F 16/2365 (2019.01)

(58) Field of Classification Search
None
See application file for complete search history.

(56) References Cited

U.S. PATENT DOCUMENTS

| | | | |
|---|---|---|---|
| 8,984,360 B2 | 3/2015 | Al Za'Noun et al. | |
| 9,152,502 B2 * | 10/2015 | Kalach ................ | G06F 11/1435 |
| 11,327,935 B2 | 5/2022 | Yamashita et al. | |

| | | | |
|---|---|---|---|
| 2014/0022255 A1 | 1/2014 | Barbouche et al. | |
| 2023/0205740 A1 * | 6/2023 | Abdelaal ................ | G06N 20/20 |
| | | | 707/692 |
| 2024/0070465 A1 * | 2/2024 | Abdelaal ................ | G06N 3/045 |

(Continued)

FOREIGN PATENT DOCUMENTS

| | | |
|---|---|---|
| EP | 4 198 835 | 6/2023 |

OTHER PUBLICATIONS

McKinsey Global Institute, "The Age of Analytics: Competing in a Data-Driven World," Dec. 2016. [Online]. Available: https://www.mckinsey.com/~/media/mckinsey/industries/public%20and%20social%sector/our%20insights/the%20age%20of%20analytics%20competing%20in%20a%20data%20driven%20world/mgi-the-age-of-analytics-full-report.pdf [Accessed Jan. 23, 2023], pp. 1-136.

(Continued)

*Primary Examiner* — Bai D Vu
(74) *Attorney, Agent, or Firm* — Nixon & Vanderhye, PC

(57)          ABSTRACT
Certain example embodiments relate to dashboards that help streamline and automate data quality management processes used with machine learning (ML) models and ML-enabled technology. A clean dataset is initialized from a dirty dataset. A search space is the set of all possible combinations of available error detection algorithms and data repair algorithms. A scoring function measures performance of a given error detection algorithm and data repair algorithm combination on the clean dataset. An ML model is trained using the clean dataset. Best error detection and data repair algorithms are selected, based on an optimization on the set of all possible combinations, and the defined scoring function. The selected best error detection algorithm is applied to the clean dataset, and a repaired dataset is generated using the selected best repair algorithm. The clean dataset is set to the repaired dataset. This procedure is repeated until a condition is met.

29 Claims, 7 Drawing Sheets

(56)                References Cited

U.S. PATENT DOCUMENTS

| | | | |
|---|---|---|---|
| 2025/0005001 A1* | 1/2025 | Fränzel | G06N 20/00 |
| 2025/0045256 A1* | 2/2025 | Gottlob | G06F 16/211 |

OTHER PUBLICATIONS

M. Abdelaal, C. Hammacher and H. Schöning, "REIN: A Comprehensive Benchmark Framework for Data Cleaning Methods in ML Pipelines," *ArXiv*, 2023, pp. 499-511.

R. Vaidyambath, J. Debattista, N. Srivatsa and R. Brennan, "An intelligent linked data quality dashboard," CEUR-WS, 2019, pp. 1-12.

C. Blacketer, E. A. Voss, F. DeFalco, N. Hughes, M. J. Schuemie, M. Moinat and P. Rijnbeek, "Using the Data Quality Dashboard to Improve the EHDEN Network," Applied Sciences, MDPI, vol. 11, No. 24, 2021, pp. 1-12.

R. Gitzel, S. Subbiah and C. Ganz, "A Data Quality Dashboard for CMMS Data," *ICORES*, pp. 170-177, 2018.

T. Papenbrock, T. Bergmann, M. Finke, J. Zwiener and F. Naumann, "Data Profiling with Metanome," VLDB Endowment, 2015, pp. 1-4.

T. Papenbrock and F. Naumann, "A Hybrid Approach to Functional Dependency Discovery," Association for Computing Machinery, 2016, pp. 1-13.

Y. Huhtala, J. Kärkkäinen, P. Porkka and H. Toivonen, "Tane: An Efficient Algorithm for Discovering Functional and Approximate Dependencies," The Computer Journal, 1999, pp. 100-111.

"YData Profiling," [Online]. Available: https://docs.profiling.ydata.ai/. [Accessed Oct. 4, 2023] pp. 1-6.

T. Akiba, S. Sano, T. Yanase, T. Ohta and M. Koyama, "Optuna: A Next-generation Hyperparameter Optimization Framework," in Proceedings of the 25th {ACM} {SIGKDD} International Conference on Knowledge Discovery and Data Mining, 2019, pages.

S. Krishnan, J. Wang, E. Wu, M. Franklin and K. Goldberg, "Activeclean: Interactive data cleaning for statistical modeling," Proceedings of the VLDB Endowment, vol. 9, No. 12, pp. 948-959, 2016.

Abdelaal, U.S. Appl. No. 18/134,913, filed Apr. 14, 2023.

https://grafana.com/ Grafana Labs; "Your waffle stack," May 2024, 7 pages.

https://dash.plotly.com/tutorial Plotly; "Dash in 20 minutes," retrieved May 2024; 17 pages.

https://pandas.pydata.org/docs/reference/api/pandas.DataFrame.html Pandas; pandas.Dataframe; retrieved May 2024; 18 pages.

https://www.redhat.com/en/topics/api/what-is-a-rest-api "What is REST API?," May 8, 2020; pp. 1-7.

https://fastapl.tiangoto.com/ FastAPI; retrieved May 2024; 19 pages.

https://mlflow.org/ "Build better models and generative AI apps on a unified, end-to-end, open source MLOps platform," retrieved May 2024; 10 pages.

https://delta-io.github.io/delta-rs/python/ "the deltalake package," retrieved May 2024; 12 pages.

https://hpi.de/naumann/projects/data-profiling-and-analytics/metanome-data-profiling.html "Metanome—Data Profiling," Information Systems Group, retrived May 2024; 11 pages.

https://optuna.org/ Optimize Your Optimization, retrieved May 2024; 7 pages.

* cited by examiner

| Upload | From Database |
|--------|---------------|

Upload a dataset

Drag and Drop or Select Files

Discard

Or use one of our default datasets flights     ✕ ▾

Upload

FIG. 3A

| Upload | From Database |
|--------|---------------|

Connect to SQL server

SQL Server     ▾ servername database table username password port

Connect

Data Profile

Functional dependencies

| Determinantion | Dependant | Score |
|---|---|---|
| id | article_title | 1000 |
| id | author_list | 1000 |
| id | article_pagination | 1000 |
| id | journal_title | 1000 |
| id | journal_issn | 1000 |
| id | article_pagination | 1000 |

Save selected FDs

Dataset properties

Dataset statistics

| | |
|---|---|
| Number of variables | 11 |
| Number of observations | 1000 |
| Missing cells | 0 |
| Missing cells (%) | 0.0% |
| Duplicate rows | 0 |
| Duplicate rows (%) | 0.0% |
| Total size in memory | 86.1 KB |
| Average record size in memory | 88.1 B |

Variable types

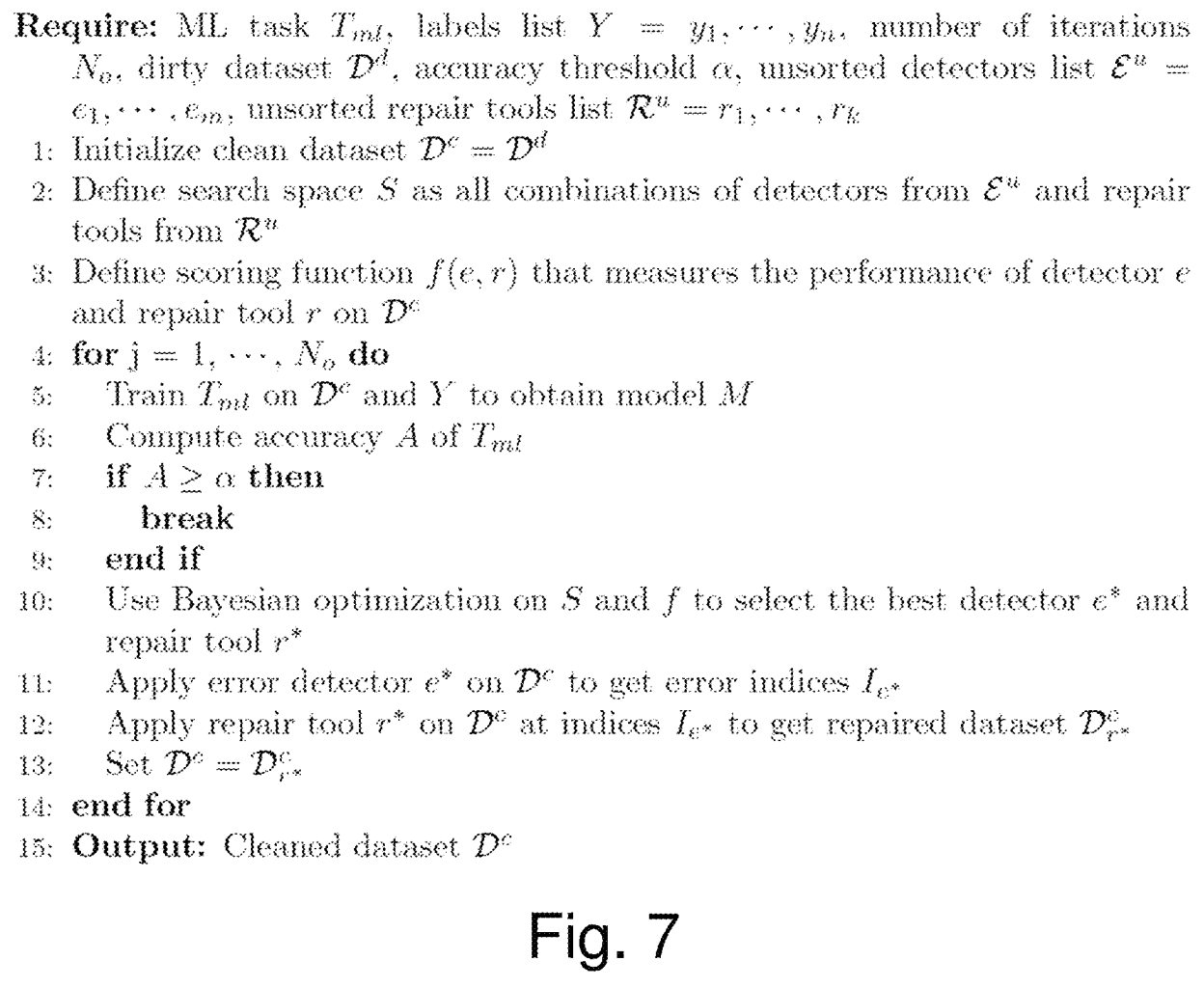

Require: ML task $T_{ml}$, labels list $Y = y_1, \cdots, y_n$, number of iterations $N_o$, dirty dataset $D^d$, accuracy threshold $\alpha$, unsorted detectors list $\mathcal{E}^u = e_1, \cdots, e_m$, unsorted repair tools list $\mathcal{R}^u = r_1, \cdots, r_k$.

1: Initialize clean dataset $D^c = D^d$

2: Define search space $S$ as all combinations of detectors from $\mathcal{E}^u$ and repair tools from $\mathcal{R}^u$ 3: Define scoring function $f(e, r)$ that measures the performance of detector $e$ and repair tool $r$ on $D^c$ 4: for $j = 1, \cdots, N_o$ do

5:     Train $T_{ml}$ on $D^c$ and $Y$ to obtain model $M$

6:     Compute accuracy $A$ of $T_{ml}$

7:     if $A \geq \alpha$ then

8:         break

9:     end if

10:     Use Bayesian optimization on $S$ and $f$ to select the best detector $e^*$ and repair tool $r^*$ 11:     Apply error detector $e^*$ on $D^c$ to get error indices $I_{e^*}$ 12:     Apply repair tool $r^*$ on $D^c$ at indices $I_{e^*}$ to get repaired dataset $D^c_{r^*}$ 13:     Set $D^c = D^c_{r^*}$ 14: end for

15: Output: Cleaned dataset $D^c$

Fig. 7

MACHINE LEARNING ORIENTED INTERACTIVE TABULAR DATA QUALITY DISPLAY SYSTEMS AND METHODS

TECHNICAL FIELD

Certain example embodiments described herein relate to improvements to machine learning (ML) technology and improvements to computer-based tools that leverage ML technology. More particularly, certain example embodiments described herein relate to modularly designed interactive data quality dashboards that help streamline and automate aspects of data quality management processes used with ML models and ML-enabled technology.

BACKGROUND AND SUMMARY

Recently, machine learning technology has been applied to a wide variety of application domains such as, for example, automotive, medical, pharmaceutical, and other domains. Machine learning (ML) technology has had a large impact on these domains. For example, in these areas, ML technology has enabled self-driving cars, novel diagnostics, personalized treatment, and other advancements.

In such domains, and in enabling the above-noted and other advancements, ML technology typically involves the collection of different data modalities, including relational data (or relational records), sensor readings, digital images and videos, audio, and text. Relational data refers to data stored in a table or a set of tables (or equivalent computer-mediated data structures), where the data is organized in the form of rows (also sometimes referred to as records) and columns (also sometimes referred to as attributes). Examples of relational data include sensor readings, medical reports, and financial records. The collected data is usually consumed by analytics tools and platforms to draw interesting conclusions and to make informed decisions. For example, the gathered data can lead to decisions on when to have an automobile speed up or slow down to avoid a collision, when to flag a shadow as a potential tumor, when to suggest a particular course of treatment with a low likelihood of adverse interactions, etc.

It will be appreciated that the value of such decisions and conclusions is highly dependent on the quality of the data used to train and test the machine-learned models, because the performance of the machine-learned models underlying these technical solutions depends on the quality of the data used to train and test them. Data quality in general refers to the condition of a set of values of qualitative or quantitative variables. In the context of tabular data, for example, data quality refers to the consistency, accuracy, completeness, relevance, and timeliness of the data. The performance of analytics tools and platforms typically will strongly degrade when the data quality is poor, e.g., when the data used for training and testing machine-learned models contains errors. For example, poor quality data can lead to poor model performance, inaccurate predictions, a lack of reliability, and ultimately, the failure of the ML-based application. A recent study found that poor data quality costs organizations an average of $12.9 million per year.

Unfortunately, real-world data suffers from several error types, e.g., because of improper join operations, noisy communication channels, inaccurate and/or incomplete manual data entry, etc. Such problems may lead to different error types, including outliers, pattern violations, constraint/ rule violations, duplicates, typographical errors, inconsistencies, formatting issues, mislabeling, implicit/explicit missing values, and the like. Moreover, these distinct error types may exist simultaneously in a given dataset. In this regard, many datasets have a heterogencity of error types. A given record in a given dataset might exhibit multiple ones of these errors. In general, inaccurate or incomplete data can lead to faulty decisions and inaccurate predictions, negatively affecting strategic planning and operational efficiency. For instance, missing or incorrect values can cause ML models to produce unreliable results; inconsistent data, in which the same item is represented differently in distinct records, can disrupt analysis processes and lead to incorrect conclusions; outdated or irrelevant data can skew the overall understanding of performance, leading to misguided strategies; etc.

To help provide for data quality in ML-based applications, a "data pipeline" typically includes various data preparation or preprocessing steps such as, for example, data annotation, data cleaning, data transformation, feature extraction, and data validation. Data quality management may be provided in connection with such preprocessing operations, as it generally involves several processes including, for example, data profiling, data cleaning, and data enrichment. Data profiling examines the data and collects statistics or informative summaries about that data. It can help identify issues such as, for example, missing values, duplicate entries, or inconsistencies.

Data cleaning (also sometimes referred to as data cleansing or data curation) involves removing or correcting errors or inconsistencies in the data, such as missing values or duplicate records. Error detection used with data cleaning will sometimes traverse the entire dataset looking for erroneous data samples, and can be implemented as a one-shot or iterative process in different instances. Ideally, data cleaning also helps convert dirty data to clean data. Dirty data may be thought of as data including low-quality data samples that contain one or more error types. Examples of error types include duplicates, outliers, constraint/rule violations, implicit missing values, explicit missing values, inconsistences, typographical errors, formatting issues, mislabeling, etc. In contrast with dirty data, clean data may be thought of as data including high-quality data samples collected without (or corrected so as to lack) error profiles. These samples may achieve a set of application-relevant quality metrics such as completeness, accuracy, timeliness, uniqueness, and consistency. Data repair techniques used with data cleaning can range from removing duplicates or filling in missing values, to more complex operations like using ML-based methods to identify outliers and decide how to handle them.

Data enrichment involves enhancing raw data with information from external sources to provide more context and depth. This can include adding demographic information, geographic information, industry-specific information, and/ or the like. Data enrichment can help improve the accuracy of the data and make it more useful for analysis.

Crafting a data quality management pipeline without broad expertise in data science unfortunately can be challenging. Indeed, there is a vast array of tools and technologies available, each tool having its own strengths and limitations. Knowing which tool to use, when to use it, and how to best use it, can require a deep understanding of both the tools themselves and the specific data quality issues at hand. For example, whether to use SQL, Python's pandas, or specialized ETL ("extract, transform, load") tools for data cleaning oftentimes depends on the nature and scale of the data, as well as the complexity of cleaning tasks.

Furthermore, effective data quality management involves not just the ability to apply tools correctly, but also an understanding of the underlying data quality problems. The latter, in turn, can involve understanding the data's domain context, the sources of potential quality issues, and the implications of these issues on the data pipeline and downstream tasks. For instance, dealing with missing data is not always as simple as just filling in blanks or removing incomplete records. A data scientist typically needs to understand why the data is missing, whether it is missing at random, how different imputation methods might bias the data, etc. Additionally, maintaining data quality is not a one-time task. It can require ongoing monitoring and adjustment as new data comes in, as the nature of the data changes, as technical requirements evolve, etc.

Data quality dashboards are tools commonly used in data quality management. Data quality dashboards typically work by first defining the kind of data to be collected and setting rules for each data element. Exceptions to these rules are detected and presented in the dashboard. The data owner (who may or may not be the dashboard user) can then take appropriate corrective action, e.g., by correcting the data or by fine-tuning the data and/or rule definitions. Unfortunately, however, this process also presents technical challenges. For instance, if the data owner has limited knowledge of data science, they may struggle to determine the appropriate corrective actions to implement and/or in effectively fine-tuning the rules through the tool. Ensuring that the corrections made are accurate and beneficial to the models is another technical challenge. This could, for example, necessitate further analysis to determine the impact of corrections, or the use of ML techniques to validate and improve the corrections.

Various attempts have been made to tackle problems associated with data visualization and data quality. For instance, one approach focuses on visualizing data of enterprise assets based on insights drawn from a knowledge graph. Another approach emphasizes comparing medical data in an automated system using a variety of visualization tools. While these approaches can provide valuable insights into the relationships and dependencies between different assets, they nonetheless could fall short in areas of data quality management, as they do not necessarily involve automated data profiling, validation, or correction, which can be valuable aspects in maintaining high-quality data. Additionally, the reliance on knowledge graphs could limit the former approach's applicability for datasets where complex relationships are not the primary concern.

Another approach introduces a system that performs basic data checks and uses a cost model to provide a data quality scorecard. However, this approach seems somewhat outdated and lacking in sophistication involving, for example, automated rule extraction, automated data correction, and machine learning model integration, which are useful techniques for modern, efficient data quality management.

A user-centric approach involving a system that receives a data quality requirement from a user may rely heavily on the user's understanding and definition of data quality, which could vary and might not address all aspects of data quality. Furthermore, an absence of features like automated data profiling, error detection, and correction or the integration with machine learning tracking tools is unfortunate, as such techniques could streamline and improve the data quality management process.

In a more research-oriented context, a dashboard for linked data quality assessment has been proposed. This dashboard leverages artificial intelligence (AI) techniques to evaluate and monitor the quality of linked data. Although it offers techniques for handling linked data, its scope seemingly is limited to this specific data type and it therefore may not provide comprehensive solutions for broader data quality issues. In another research endeavor, a data quality dashboard was applied to ensure conformance to model specifications within the European Health Data and Evidence Network (EHDEN). While the dashboard's application in a network like EHDEN underlines its potential, it also seemingly is heavily tailored to specific requirements of that network and may not be fully applicable to other domains or data types. Likewise, a data quality dashboard for Computerized Maintenance Management System (CMMS) data where all equipment failures are reported involves a high level of specialization, which apparently limits its broader applications. These older research efforts lack recent trends in data quality management, such as deep integration with machine learning tools and processes.

There are commercially available data quality dashboards from a variety of providers. These tools offer a variety of features designed to monitor and improve data quality. Yet they also present certain technical challenges. Configurations for these dashboards can be complex, often requiring skilled personnel to set them up and manage them effectively. The integration of these tools into existing systems may require additional effort and customization, potentially leading to increased overhead and complexity. Furthermore, these tools typically require users to define various parameters, such as data sources, data profiling objectives, data quality rules, thresholds, and metrics. While this offers a high degree of flexibility, it can also place a significant burden on users, particularly those with less technical expertise in data quality management.

Thus, although there are tools and methods available, they unfortunately have shortcomings that present challenges for their adoption in real-world applications. These shortcomings generally fall into several categories. First, there is an issue with limited data quality management, as at least some existing approaches focus on data visualization and fail to address aspects of data quality management, such as automated data profiling, validation, and correction. Second, some approaches are outdated in that they do not consider recent advancements in data quality management. Third, there tends to be a high degree of dependence on a user's understanding. In this regard, users' understandings and definitions of data quality can vary considerably and may not cover all aspects of data quality in a clear, consistent, and efficacious manner. Fourth, more in-depth approaches tend to have limited scopes, e.g., scopes limited to specific data types or domains, which can hinder broader application. Finally, there tends to be a high degree of complexity and user burden, especially with commercially available tools. In this regard, commercial data quality dashboards can be complex to configure and integrate into existing systems, requiring skilled personnel and potentially increasing overhead.

Certain example embodiments help address the above-described and/or other concerns. For example, certain example embodiments provide technology-based improvements to technology-based tools used in data quality management, especially in the ML context. Certain example embodiments involve automating data quality dashboards together with a focus on generating high-quality data suitable for ML training and serving.

In this regard, certain example embodiments help improve existing data quality management tools by providing an automated, interactive dashboard. Certain example embodiments leverage advanced algorithms and ML for automated data profiling, validation, error detection, and correction. Certain example embodiments are able to integrate with common ML tracking tools like MLflow and Delta Lake, enabling robust data management and tracking of changes over time. Additionally, certain example embodiments are configured to generate detailed DataSheets for transparency and support iterative cleaning for continuous improvement (or at least improvements over time). The role of the data owner is streamlined, reducing the technical burden while improving input value, making the solution of certain example embodiments efficient, effective, and user-friendly. Moreover, certain example embodiments support the "user-in-the-loop" strategy, enabling users to add their rules or to define certain data samples to be corrected. Finally, an iterative cleaning strategy enables the generation of repair data versions well-suited for ML training and serving.

In certain example embodiments, there is provided a machine learning (ML) model dataset preparation method for use with a system having access to a plurality of error detection algorithms, a plurality of data repair algorithms, and an ML model. The method comprises: (a) accessing a dirty dataset from a data store; (b) initializing a clean dataset to the accessed dirty dataset; (c) defining a search space as the set of all possible combinations of the error detection algorithms and data repair algorithms, wherein a scoring function is defined to measure performance of a given error detection algorithm and data repair algorithm combination on the clean dataset; (d) training the ML model using the clean dataset; (e) selecting a best error detection algorithm and selecting a best data repair algorithm, based on an optimization on (i) the set of all possible combinations of the error detection algorithms and data repair algorithms and (ii) the defined scoring function; (f) applying the selected best error detection algorithm to the clean dataset; (g) generating a repaired dataset by applying the selected best repair algorithm to the clean dataset; (h) setting the clean dataset to the repaired dataset; (i) repeating (d) through (h) until a condition is met; and (j) outputting the cleaned dataset.

In accordance with certain example embodiments, the training in (d) may include training the ML model using the clean dataset and a plurality of labels.

In accordance with certain example embodiments, the scoring function may include a root mean square error (RMSE) calculation and/or a F1 score.

In accordance with certain example embodiments, the optimization may be Bayesian optimization.

In accordance with certain example embodiments, (d) through (h) may be performable up to a predetermined number of repetitions. This may further include, for example, computing accuracy of the trained ML model with each repetition following (d) and prior to (i); and potentially causing further repetitions to cease provided that the computed accuracy exceeds a predetermined threshold.

In accordance with certain example embodiments, the cleaned dataset output in (j) may be used as training data.

In accordance with certain example embodiments, the dirty dataset may be accessed from a file and/or a database.

In accordance with certain example embodiments, the error detection algorithms and/or the data repair algorithms may be implemented in software modules external to the system, e.g., with some or all being accessible by API calls.

In accordance with certain example embodiments, a user selection of one or more of the error detection algorithms may be received, e.g., with the set of all possible combinations of the error detection algorithms and data repair algorithms potentially being limited by the received user selection(s).

In accordance with certain example embodiments, parameters of the selected best error detection algorithm and the selected best repair algorithm associated with each respective repetition may be stored. For example, a representation of the repaired dataset associated with each respective repetition additionally may be stored.

In accordance with certain example embodiments, the repetition may include iteratively cleaning the dirty dataset from the data store and, for each repetition: storing to a structured data type information about the selected best error detection algorithm and the selected best repair algorithm for the respective repetition, including an identification of the selected best error detection algorithm and the selected best repair algorithm for the respective repetition and parameters and artifacts used therewith.

In accordance with certain example embodiments, the error detection algorithms may comprise automatically generated error detection rules and/or user-defined error detection rules.

In accordance with certain example embodiments, a user may be provided with the ability to tag dirty values, e.g., using the dashboard.

In accordance with certain example embodiments, at least some of the error detection algorithms may be run sequentially within a single repetition of steps (d) through (h) discussed above, e.g., prior to one of the data repair algorithms being implemented. In some instances, application of the error detection algorithms may generate a plurality of detected errors, and redundancies may be removed from the detected errors.

Counterpart systems and/or methods also are contemplated herein. For instance, in certain example embodiments, there is provided an ML model dataset preparation system having access to a plurality of error detection algorithms, a plurality of data repair algorithms, and an ML model, with the system comprising a data store storing a dirty dataset, as well as a memory and at least one processor configured to execute instructions stored in the memory to perform operations corresponding to the techniques set forth in detail below and/or those summarized in any one or more of the prior 12 paragraphs. Similarly, in certain example embodiments, there is provided a non-transitory computer readable storage medium storing instructions that, when executed, cause a processor of a system having access to a plurality of error detection algorithms, a plurality of data repair algorithms, and an ML model, to perform operations corresponding to the techniques set forth in detail below and/or those summarized in any one or more of the prior 12 paragraphs.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 3A-3B are example screenshots showing how data can be ingested in certain example embodiments;

FIG. 4 is an example "Data Profile" tab that comprises generated functional dependency rules and a data profile, in accordance with certain example embodiments;

FIG. 7 is pseudo-code for an ML-oriented iterative cleaning algorithm, which may be implemented in accordance with certain example embodiments.

DETAILED DESCRIPTION

Figure 1:
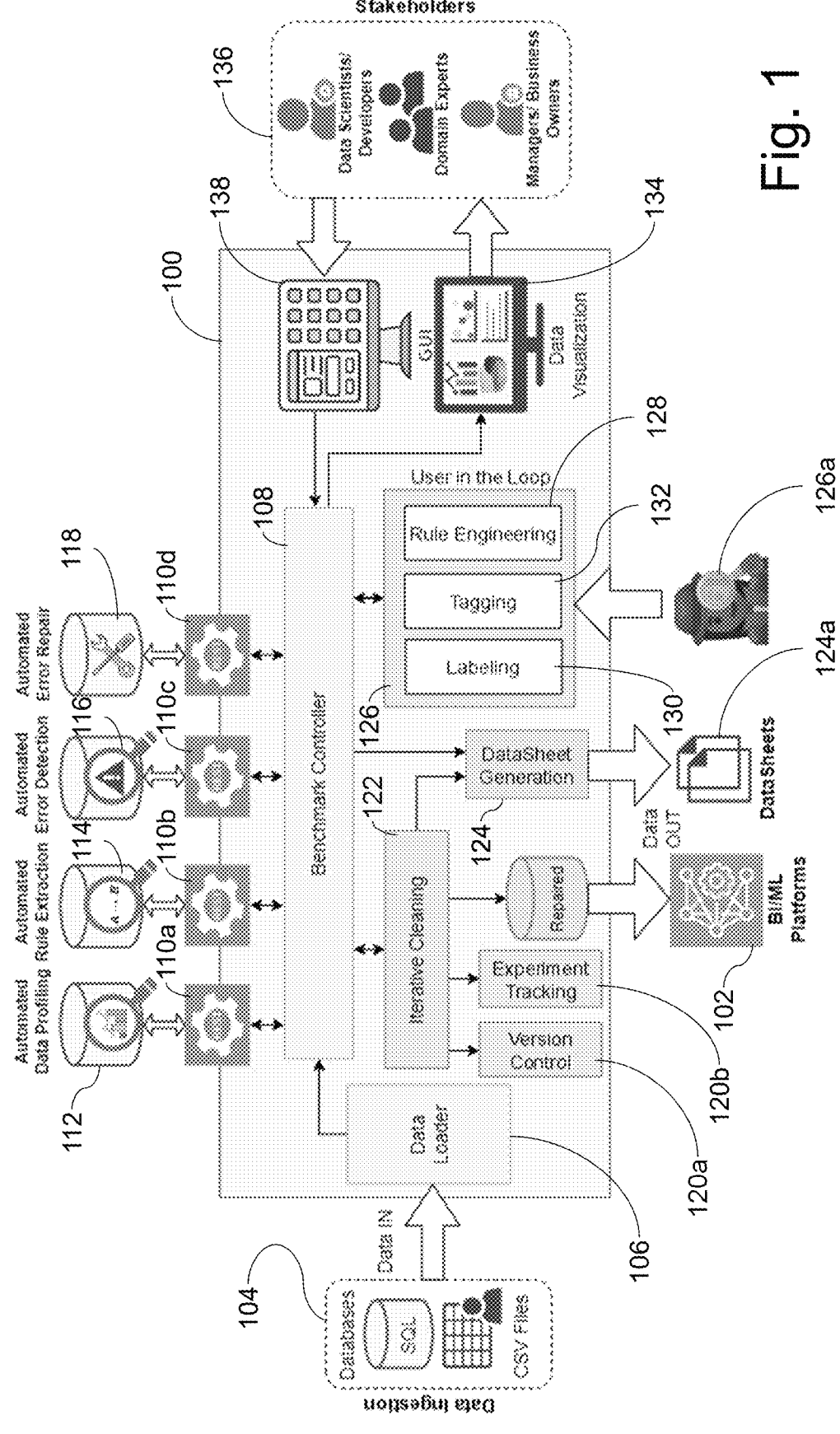
FIG. 1 is a block diagram showing a system for providing an automated, interactive, and iterative data quality dashboard in accordance with certain example embodiments.

Certain example embodiments described herein relate to modularly designed interactive data quality dashboards that help streamline and automate aspects of data quality management processes used with ML models and ML-enabled technology. The approach of certain example embodiments enhances the field of data science and improves existing tools, e.g., in connection with data profiling, validation, error detection, and correction related techniques. Certain example embodiments employ an automated data profiling feature where, instead of manually defining rules for data profiling, this feature automatically extracts these rules, saving time and reducing the potential for human error. This automated extraction approach leverages advanced algorithms (including those identified below, for example), considering both statistical properties and domain-specific characteristics of the data in certain example embodiments.

The dashboard of certain example embodiments also includes an automated data validation and error detection module, configured to handle both quantitative and qualitative error types. This module uses ML techniques and statistical techniques to identify inconsistencies, outliers, and other data quality issues, providing a more comprehensive and accurate assessment of data quality. Another feature of the dashboard is the automated data correction component. This module uses proposes and applies corrections to identified data errors, reducing the manual intervention traditionally required in data cleaning processes. The dashboard of certain example embodiments includes integration capabilities for common ML tracking tools, allowing for seamless tracking of data quality experiments, models, and results, and providing a unified view of both data quality management and ML processes. Certain example embodiments also integrate with Delta Lake, enabling tracking of different data versions. This feature brings robustness to data management, allowing for the tracking of changes over time, and facilitating rollbacks to previous data versions if appropriate.

Certain example embodiments are configured to generate DataSheets, which capture information including data version tags, hyperparameters, generated rules, data quality metrics, employed cleaning tools, and/or the like. This feature provides a detailed and structured record of data quality management activities, enhancing transparency and reproducibility. The dashboard of certain example embodiments also supports iterative cleaning, running several cleaning iterations, e.g., to help optimize or improve the performance of downstream machine learning models. This process can help to continually improve data quality and model performance over time.

In certain example embodiments, the role of the data owner is streamlined and focused. The data owner can, for example, focus on validating the generated rules and/or corrections, if necessary, and labeling data samples to train ML models used for data validation or correction. This approach helps leverage the value of domain expert input while reducing the concomitant technical burden. As will be appreciated, then, certain example embodiments provide a comprehensive, automated, and user-friendly solution for data quality management, offering technical improvements over existing tools, e.g., in terms of efficiency, effectiveness, and transparency.

FIG. 1 is a block diagram showing a system 100 for providing an automated, interactive, and iterative data quality dashboard in accordance with certain example embodiments. The FIG. 1 system 100 helps optimize data quality for downstream applications 102 such as, for example, business intelligence (BI) and machine learning (ML) platforms. Data is ingested from one or more sources 104. These sources may include, for example, SQL databases, CSV files, etc. The system 100 incorporates a data loader 106 that feeds the input data from the source(s) 104 into a controller 108. The controller 108 helps control other modules in the system 100, e.g., as data is ingested, stakeholders provide input or request data visualizations, versions of data sets are created during cleaning operations, etc.

To help promote a modular design, the dashboard can integrate with external tools using interfaces 110a-110d, e.g., using a set of REST APIs or the like. An automated data profiling module 112 analyzes the ingested data, identifying and recording its characteristics. An automated rule extraction module 114 generates rules based on statistical properties and domain-specific features present in the ingested data. The automated data profiling module 112 and the automated rule extraction module 114 may operate concurrently in certain example embodiments. These rules extracted by the automated rule extraction module 114 are used by other modules (e.g., subsequently), including for example an automated error detection module 116 and an automated error repair module 118. In certain example embodiments, a meta-learning approach may be used to extract rules and thereby generate new error detectors. See, for example, U.S. Publication No. 2023/0205740, the entire contents of which are incorporated herein by reference.

The automated error detection module 116 scans the ingested data based on the extracted rules, identifying inconsistencies, outliers, and/or other potential issues. Identified errors are then passed to the automated error repair module 118, which can leverage a variety of approaches to propose and apply corrections to the detected errors (e.g., as discussed in greater detail below). The automated error repair module 118 helps increase accuracy while minimizing the necessity for manual intervention in the data cleaning process.

Version control 120a and experiment tracking 120b may operate in parallel with the error detection and repair, e.g., as managed by the iterative cleaning module 122. Version control 120a maintains a record of each data version throughout the iterative cleaning process. This allows for robust data management and facilitates rollback to previous data versions if necessary or desired. A DataSheet generator 124 generates DataSheets 124a by capturing information such as, for example, data version tags, hyperparameters, generated rules, data quality metrics, employed cleaning tools, etc.

The system 100 is enhanced by the user-in-the-loop module 126 (with which a user 126a may interact, as described in greater detail below) and the iterative cleaning module 122. The user-in-the-loop module 126 supports active user involvement, empowering users to validate or adjust the system-generated rules and corrections, as well as to introduce their own custom rules, via the rules engineering module 128. The user thus may generate their own user-defined rules for use in certain example embodiments. The user-in-the-loop module 126 also enables users to annotate specific data samples via the labeling module 130 to train machine learning models that are utilized for data validation or correction. Furthermore, this module facilitates proactive error management by allowing users to tag data samples known to be corrupted in advance via the tagging module 132. In other words, in certain example embodiments, users can tag dirty values in data samples. At least some attribute-specific rules, for example, can be based on (e.g., derived from) these user-tagged dirty values.

It will be appreciated that the ability to tag dirty data within a dashboard according to certain example embodiments can be beneficial when developing and/or maintaining high-quality datasets. When users are empowered to tag dirty data based on their intimate knowledge of the dataset's context and content, for example, such tagging in essence can act as a crowdsourced quality control mechanism. For instance, a user might notice that a sales report contains duplicate entries for a transaction, or that the customer age field contains impossible values, such as −1 or 300. By tagging these anomalies, the user highlights them for review, either for immediate correction or for training automated data-cleaning algorithms, such as RAHA and ML-based imputers. This hands-on approach not only helps in rectifying errors but also contributes to the creation of a feedback loop where the data quality system learns from the tags to better identify and manage dirty data in the future. This approach also can be especially beneficial in dynamic environments where data is constantly updated and/or where the impact of inaccuracies can be substantial.

The iterative cleaning module 122 implements a cyclical cleaning process on the input data. By executing multiple cleaning iterations, it optimizes the quality of the data progressively, enhancing the performance of downstream applications. This iterative process can be particularly effective in dealing with complex or persistent errors, as each cycle further refines the data and gradually eliminates these issues.

The output of the system is the cleaned data, which can be used for applications in BI, ML, or other platforms. The system also provides data visualization tools 134 to enable different stakeholders 136, such as data scientists, developers, domain experts, managers, and business owners to review and understand the data cleaning process and results. The stakeholders 136 can interact with these data visualization tools 134 via the graphical user interface 138.

Thus, it will be appreciated that certain example embodiments provide a comprehensive, automated, and user-friendly solution for data quality management, offering significant improvements in efficiency, effectiveness, and transparency.

As will be appreciated by those skilled in the art, the system 100 may be implemented in connection any suitable computing environment. For example, the system 100 may be housed on a server system including at least one processor and a memory. The memory may store computer code corresponding to some or all of the modules described herein, and the processor(s) may execute the corresponding code. The data loader 106 may include suitable interfaces (e.g., APIs or the like) for ingesting the data from the one or more data sources 104. The system 100 also may include one or more storage media for storing results relevant to, for example, version control 120a and experiment tracking 120b. The GUI 138 may receive instructions from the stakeholders 136 using respective computer terminals (e.g., each including their own processor(s) and memory executing code for interfacing with the system 100, e.g., via a webpage, a dedicated application, and/or the like). Data visualization 134 may be provided via the same communication channel over which the GUI 138 operates, e.g., so that the stakeholders 136 can view the data visualizations on their respective terminals (e.g., via webpages, application instances, etc.). The modules 112-118 may be hosted locally or remotely and, in a similar manner, they may provided on one or more computer systems of their own.

Example Implementation

Details concerning an example implementation are provided below. It will be appreciated that this example implementation is provided to help demonstrate concepts of certain example embodiments, and aspects thereof are non-limiting in nature unless specifically claimed. It will be appreciated that other development languages, development tools, error detection approaches, cleaning approaches, etc., may be used in connection with or in place of that which is described below.

Figure 2:
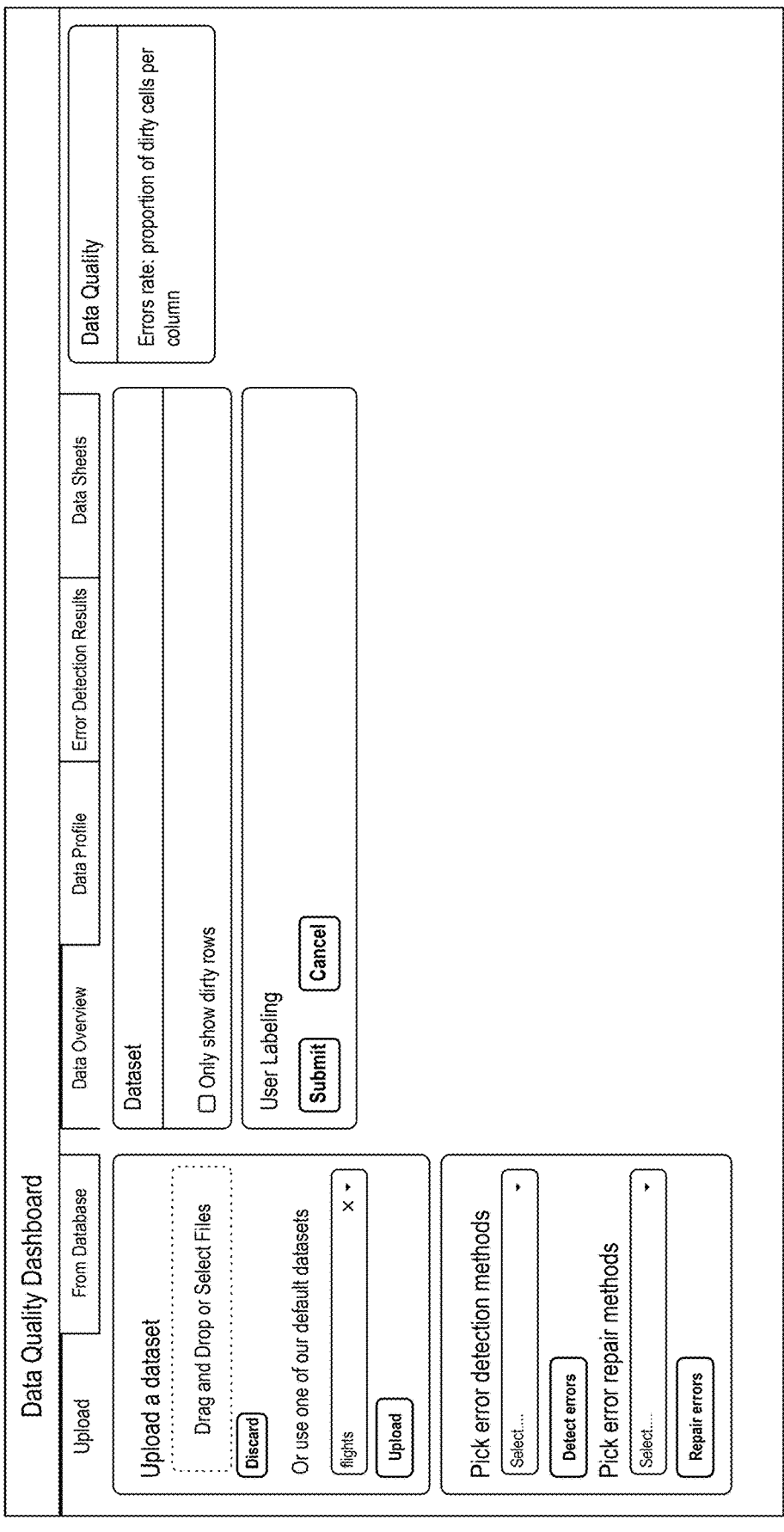
FIG. 2 illustrates an initial interface to the system of certain example embodiments.

FIG. 2 illustrates an initial interface to the system of certain example embodiments. The left segment of the FIG. 2 example dashboard contains a user interface for data upload, providing a convenient way for users to introduce their input data. Additionally, this area allows users to explore dashboard functionality using a variety of pre-loaded datasets. In certain example embodiments, these datasets may be built-in features of the dashboard, provided so that users can explore the dashboard's capabilities from the outset, even if the users lack datasets of their own. Users can also select from a range of automated error detection and repair tools (including those described in detail below), enhancing the adaptability of the system to diverse data quality needs.

The central part of the FIG. 2 example dashboard is organized into several tabs: Data Overview, Data Profile, Error Detection Results, and DataSheets. The Data Overview tab displays both the uploaded datasets and any detected errors, providing a quick snapshot of the data and its quality issues. A dedicated user labeling section is included, and it allows users to label selected data samples as either "true" (i.e., dirty) or "false" (i.e., clean). This interaction aids in refining the performance of the automated error detection and repair tools. The Data Profile tab presents the findings of the data profiling tools, offering Insights into the characteristics and structure of the dataset.

The Error Detection Results tab visualizes the output of the error detection tools, making it easy to understand and manage detected errors. The DataSheets tab displays the generated DataSheet with important metadata and gives users the ability to download these files for further analysis, record-keeping, etc.

The right segment of the dashboard hosts the Data Quality section, providing visual representations of various data quality metrics. For example, it may display the error rate for each column in the input dataset, enabling users to understand and address column-specific data quality issues. This comprehensive dashboard design of FIG. 2 provides a user-friendly, interactive, and effective approach to managing and improving data quality.

Certain example embodiments use Python and Dash as development languages. Dash is an open-source Python framework geared towards creating interactive web applications in connection with dashboard building. Dash is well-suited for visualizing both time-series and non-time-series data, providing a broad spectrum of components and tools for crafting data visualizations and dashboards. Dash is built upon Plotly, a robust data visualization library known for its array of interactive charts and plots. Plotly is engineered to work seamlessly with a diverse range of data sources and supports the visualization of both time-series and non-time-series data. The data quality dashboard of certain example embodiments can leverage the capabilities of Dash and Plotly, for example, to build a comprehensive and interactive data quality dashboard. Other tools, like Grafana, can be used as well, although the suitability for displaying both time-series and non-time-series data may vary depending on the specific tool(s) used.

The following sections provide overviews of the various modules of the FIG. 1 system, including modules used for data ingestion, REST APIs for modular design, automated rule extraction, automated data profiling, automated error detection, automated error repair, DataSheets generation, the user-in-the-loop module, and the iterative cleaning module.

Example Data Ingestion Module Techniques

This section elaborates on the mechanisms through which users can specify the sources of their data. FIGS. 3A-3B are example screenshots showing how data can be ingested in certain example embodiments. As shown in FIGS. 3A-3B, data can be ingested into the dashboard via one of two methods: (1) uploading from a CSV or Excel file, or (2) establishing a SQL database connection. When a dataset is uploaded as a CSV or Excel file, an automatic process is initiated in the backend of the system. A dedicated folder, bearing the same name as the uploaded file, is created to house the dataset. This dataset is stored within this folder under the filename "dirty.csv." A subfolder is also established within this directory to accommodate a Delta table associated with this dataset. (Further details regarding the Delta table are provided below). Additionally, the uploaded dataset is preserved in the backend as a Pandas DataFrame. Pandas is a data manipulation tool in Python, and storing the data as a DataFrame allows for efficient data processing and manipulation in subsequent stages of the data quality management process. It will be appreciated that the file names, input file types, structures, and locations for preserving the dataset are provided by way of example and without limitation.

In addition to file-based datasets, users also can connect the system to databases to import specific tables or other database structures. The dashboard may, for example, support connections to MySQL, PostgreSQL, Microsoft SQL Server, and/or other databases. Users can input their credentials and precisely specify the table(s) and the dataset they wish to load onto the dashboard. Once loaded, these tables are treated identically to uploaded tables. To establish a connection to the respective database, users manually enter the server, database, table, username, password, and if required, the port. Python-based frameworks like pyodbc, mysql.connector, and psycopg2, for example, may be implemented to facilitate these connections.

To import the table, the data loader executes a SQL query to fetch it. The fetched data is then formatted into a pandas DataFrame or the like. This standardization allows the imported data to be integrated into the workflow in the same manner as a file-based dataset.

Once the data is uploaded, it is displayed on the "Data Overview" tab on the dashboard, ready for users to initiate error detection and repair processes. This streamlined and flexible data import mechanism helps ensure seamless integration of diverse data sources into the data quality management workflow.

Example Automated Data Profiling and Cleaning Techniques

A description of the interfaces (e.g., APIs) that play an integral role in standardizing the communication between the dashboard and external tools will now be provided, followed by further details regarding the automated data profiling and data cleaning tools.

Example APIs

The APIs of certain example embodiments are implemented as REST APIs. As is known to those skilled in the art, REST (Representational State Transfer) API is a set of architectural principles that define how web services can be designed to helps ensure interoperability between systems on the Internet. In the context of the data quality dashboard of certain example embodiments, the REST API serves as a standardized interface that facilitates the interaction between the dashboard and various external data quality tools. For example, these APIs enable the exchange of data and instructions between the dashboard and the respective tools, thereby facilitating seamless integration and operation within the system. This uniformity in communication enhances the scalability and flexibility of the system, allowing for easy incorporation of new tools and services as needed.

To implement the REST APIs, the FastAPI framework may be used. FastAPI is a modern, high-performance, web framework for building APIs with Python, based on standard Python type hints. The reference to Python type hints relates to a feature of the Python language, which allows developers to indicate the expected data types of function arguments, return values, and variables within their code. In the context of FastAPI, for example, type hints are used to define the expected request and response data structures. FastAPI uses these type hints to perform data validation, serialization, and documentation, which makes it easier to build robust and well-documented APIs. API calls are implemented for use with the system of certain example embodiments to facilitate communication with the external tools, including POST, GET, and PUT. POST is an HTTP method used to forward tasks or requests to the external tools. It is generally used to submit data to be processed by the specified tool. Conversely, GET is an HTTP method used to retrieve the results from the external tools. It requests data from a specified tool and is used to fetch information based on the given request parameters. PUT is an HTTP method used to update existing information related to a specific request. The following table includes a list of REST APIs that are employed to establish communication with the external tools, in certain example embodiments.

| API | Request Body | Description |
|---|---|---|
| /file_info_store (POST) | { "dirty_path": string, "dataset_name": string, "dataset_shape": [ int, int], "uiltags": [ ], "version": Optional[int] } | This API request is designed to persistently store the metadata associated with the uploaded dataset for subsequent retrieval and usage. Upon successful execution, it yields a confirmation string as an affirmation of successful data retention. |
| /detection (POST) | { "detection_methods": [ string ] } | This API request accepts a list of detection methods as detailed below and executes these methods on the provided dataset. It returns a dictionary that encapsulates the identified erroneous cells. If the RAHA approach is utilized, the dictionary will also contain a RAHA tuple (see below) and the count of remaining RAHA tuples that require labeling. If the RAHA approach is not employed, these fields will be returned as empty and zero, respectively. |
| /profile (GET) | None | It executes data profiling as described below and returns the relative path of the data profile for the dataset, so that the dashboard can display it. |
| /repair (POST) | { "repair_method": string } | This API request accepts a specified repair method and executes it in line with previously detected anomalies, as described below. Upon successful execution of the repair operation, it returns the file path of the repaired dataset. |
| /fd (GET) | None | This API request returns the functional dependencies rules as described below. |
| /labeled-tuple (POST) | { "user_label": [string] } | This request is part of the RAHA detection process, which is described below. It receives a list of cells of a RAHA tuple that was labeled by a user with the form: {'row': int, 'column': int, 'column_id': string, 'row_id': string} It returns a new tuple and the number of tuples left to label by the user. |
| /raha-detect (GET) | None | The API request executes the RAHA detector once all the tuples have been appropriately labeled. If the ground truth is available, this call generates and returns evaluation metrics, including Precision, Recall, and the F1 Score, to assess the accuracy of the detection process. Additionally, it returns the detection dictionary that encapsulates the details of the identified dirty samples as per the RAHA detection method. |
| /cancel-raha (PUT) | None | This request cancels the RAHA process and returns confirmation. |
| /generate-datasheet (GET) | None | Following the data repair process, this API request generates a comprehensive DataSheet that outlines the entire procedure, as explained below. Upon successful creation of this DataSheet, the API request returns the relative file path to the DataSheet, facilitating easy access and future reference. |

Example Automated Rule Extraction and Data
Profiling Techniques

After a dataset is uploaded to the dashboard, the "Data
Profile" tab showcases the dataset's properties. This tab
provides a detailed overview of the dataset's attributes,
helping to ensure that users have ready access to vital
information about the dataset. This information includes
functional dependency (FD) rules and the data profile.
Leveraging a command-line interface (such as that provided
by Metanome, for example) in conjunction with other FD
detectors (e.g., HyFD and Tane), certain example embodi-
ments identify all FDs within the dataset. These detected
FDs are then displayed on the dashboard for user review.
Users are afforded the flexibility to select individual FDs and
persist them for subsequent utilization with error detection
methods.

FIG. 4 is an example "Data Profile" tab that comprises
generated FD rules and the data profile, in accordance with
certain example embodiments. The yData-profiling library
or the like may be used in certain example embodiments to
generate a thorough data profile report, which is subse-
quently displayed to the user. Regardless of the library used,
the generated report offers a comprehensive overview of the
dataset, encompassing descriptive statistics and visualiza-
tions of data distribution for each column, measures of
central tendency, and variable frequencies, for example.
Furthermore, it identifies correlations between variables,
identifies missing data points, and flags potential data qual-
ity issues. This holistic data profiling aids in gaining a deeper
understanding of the dataset's characteristics and potential
challenges.

Example Data Error Detection Techniques

Figure 5:
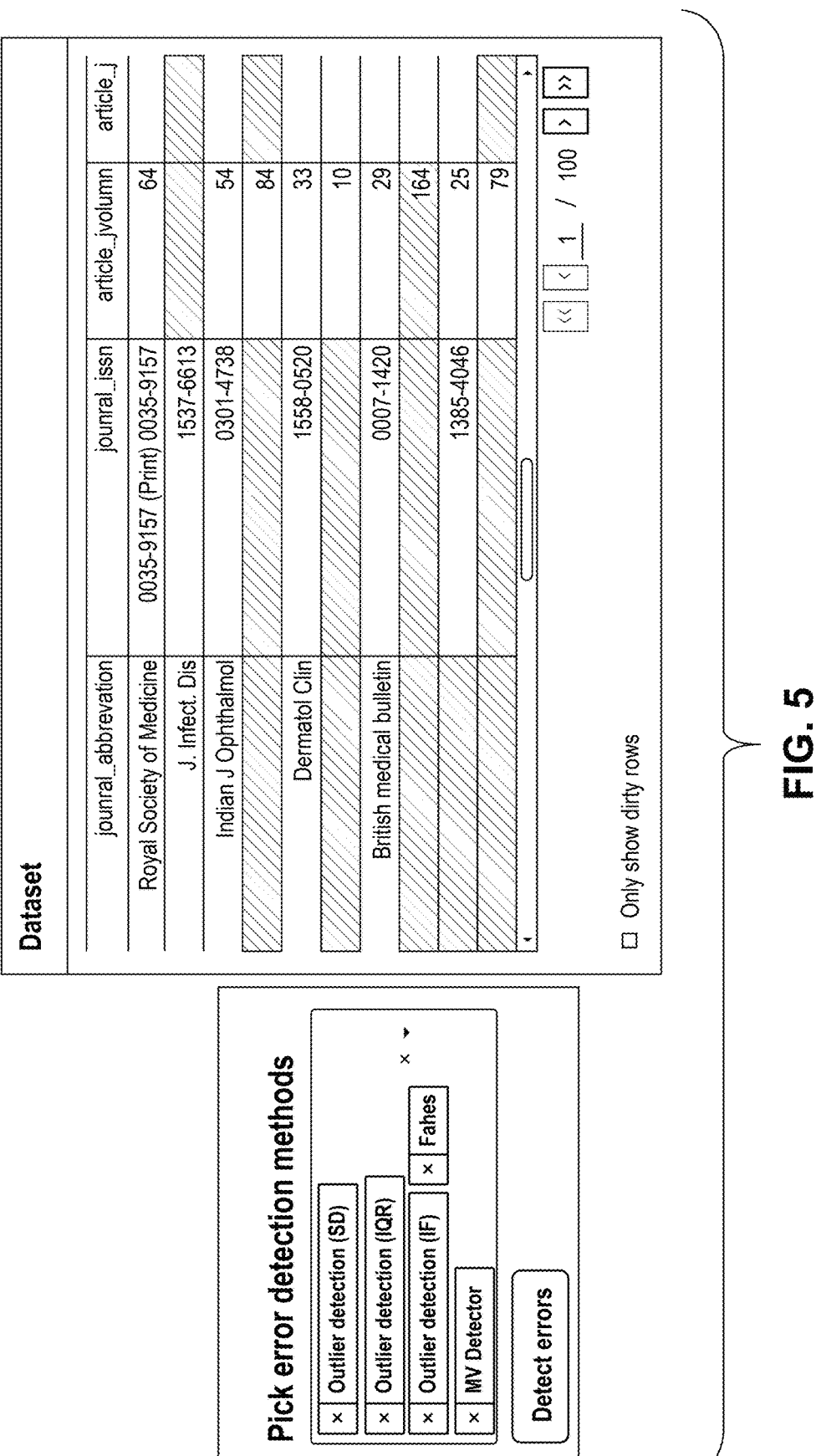
FIG. 5 is an example view of a user interface showing error detection methodologies that may be used (to the left) and representations of detected data errors (to the right), in accordance with certain example embodiments.

This section describes the integration of automated error
detection tools with the data quality dashboard, in accor-
dance with certain example embodiments. The system incor-
porates a comprehensive array of error detection method-
ologies such as, for example, the methodologies shown in
FIG. 5. More particularly, FIG. 5 is an example view of a
user interface showing error detection methodologies that
may be used (to the left) and representations of detected data
errors (to the right), in accordance with certain example
embodiments. Example methodologies may include some or
all of the following and/or other approaches:

Outlier Detector: This approach employs various statisti-
cal measures such as standard deviation, interquartile
range, and isolation forest for the identification of
anomalies.

FAHES: A method designed to detect disguised missing
data.

NADEEF: A generalized data cleaning system that uses
declarative rules for error detection.

KATARA: A knowledge-based data cleaning framework.

HoloClean: A probabilistic data repairing system.

MV Detector: A missing value detection tool.

RAHA: A configuration-free ML-based error detection
system.

Min-K: An ensemble method that identifies errors by
combining the detections of other detection methods.

Once the dataset is uploaded by the user, the user can
choose the detection methodologies to be utilized, e.g., from
a list of pre-provided detection methodologies. Post-selec-
tion, the user initiates the error detection process by clicking
on the "Detect Errors" button. Each selected method is
executed in the backend of the system. The system collates the errors identified by each method, e.g., into an array or
other structure. This structure is subsequently passed to the
frontend, and the visualization at the frontend serves as a
comprehensive error report.

The RAHA data detection algorithm operates on an
interactive model, with user intervention provided for the
iterative labeling of dirty cells. Unlike other detection meth-
ods, RAHA functions independently due to this user-depen-
dent operational modality. In this context, "independently"
refers to RAHA operating on a distinct execution path
compared to other detectors. Most detectors involve a pro-
cess where the user selects them and initiates the error
detection by clicking the "detect errors" button or a similar
feature. RAHA on the other hand uses a different approach
because it relies on user-provided labels as part of its
execution process. To accommodate RAHA's specific
requirements, specialized scripts have been developed to
facilitate its operation. The initialization of RAHA may be
synchronous with the launch of additional detection methods
in certain example embodiments, thereby providing parallel
commencement. However, its resulting computation and
visualization may occur asynchronously with the other error
detection approaches in that it may be contingent, for
example, on the user's completion of labeling (e.g., tuple
labeling as discussed below). It will be appreciated that the
detectors of certain example embodiments (RAHA
included) execute in a sequential manner. This sequential
execution helps ensure that each detector runs one after the
other, with a new detector starting its process only after the
previous one has completed its cycle. This approach helps
ensure that that output generation is reflective of the user's
inputs and is not prematurely presented prior to the final-
ization of data labeling.

Figure 6:
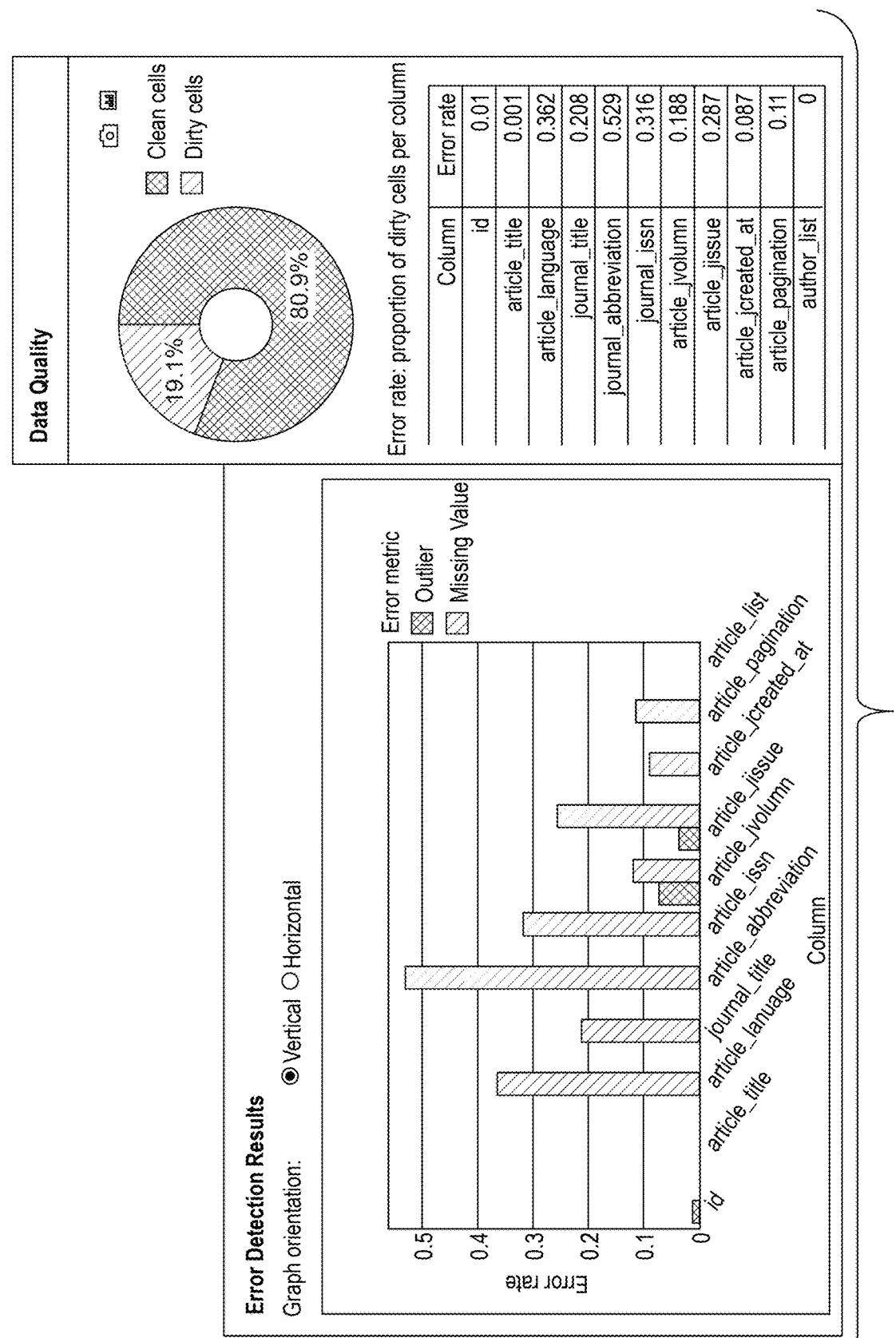
FIG. 6 is a view showing statistics related to errors detected using the selected FIG. 5 methodology(ies), in accordance with certain example embodiments.

Upon the completion of the error detection process, the
dashboard conveys the catalogue of dirty data samples to the
frontend interface. Within the Dataset view, cells identified
to contain errors are visually marked (e.g., with a red
coloration or other marker, as will be appreciated from FIG.
5), facilitating easy identification of dirty data samples. In
addition, the dashboard presents a comprehensive statistical
analysis of the detected errors, as depicted in FIG. 6. Thus,
it will be appreciated that FIG. 6 is a view showing statistics
related to errors detected using the selected FIG. 5 method-
ology(ies), in accordance with certain example embodi-
ments. FIG. 6 in this example includes metrics such as the
ratio of dirty cells to the total dataset, a column-wise
breakdown of the dirty cell distribution, and a classification
of error types observed in each column. These statistics
provide a granular understanding of the error landscape
within the dataset.

After detection, the identified errors are persisted in a
structure, e.g., a dedicated file named "detections.csv." This
structure in certain example embodiments is stored in the
same directory as the original dataset, helping to ensure easy
access and association with the corresponding data source.

Example Data Error Repair Techniques

Upon completion of the error detection phase, users can
initiate error repair methods. Different repair strategies are
provided in different example embodiments, and the avail-
able repair strategies may be distinct from one another in
some instances. For example, ML-based and/or non-ML-
based imputation may be enabled. An ML-based imputation
method may, in turn, use different techniques depending on
the nature of the data. For numerical columns, for example,
Decision Tree algorithms may be used. These algorithms construct prediction models in the form of tree structures, making them effective in handling numerical data. For categorical columns, for example, the k-Nearest Neighbors (k-NN) method may be employed. This technique identifies the "k" most similar instances within the dataset and uses their values for imputation, making it suitable for categorical data. Other approaches may be used in different example embodiments.

In comparison to ML-based imputation methods, non-ML-based imputation methods may use comparatively simpler and/or more direct techniques. For numerical columns, for example, the arithmetic mean of the existing values may be computed and used to replace the erroneous or missing values. For categorical columns, a predetermined "dummy" value may be used to impute the errors. Other approaches may be used in different example embodiments (e.g., using the median or mode, generating random values within an extracted or identified range potentially with a predetermined frequency or a frequency matching that in the existing dataset, etc.). These methods provide the withs a choice between sophisticated, ML-driven repair and simpler, straightforward imputation, enabling them to choose the most suitable approach based on the nature and complexity of the dataset.

The selected repair method operates on the detected errors, e.g., sourced from the "detections.csv" file. Each identified dirty data sample is subjected to imputation using the selected repair method, resulting in a repaired DataFrame. In certain example embodiments, this repaired DataFrame is subsequently stored as a .csv file in the same directory as the input dataset .csv file. This approach helps to ensure easy retrieval and comparison with the original dataset. In addition to the .csv or other storage, the repaired DataFrame is also committed as a new version into the dataset's Delta Lake, a storage layer that provides ACID (atomic, consistent, isolated, and durable) transactions for big data workloads. This enables version control and traceability of the dataset, facilitating analysis over time and across different versions of the data. Further details regarding Delta Lake storage are provided below.

Example Artifact Tracking and Version Control Techniques

To help ensure reproducibility of the data operations, a rigorous tracking system records both the parameters and artifacts employed during the error detection and repair processes. This includes the specific configurations of the algorithms used, the choice of imputation methods, and any other pertinent settings or decisions made during the procedures. In addition, a version control system is maintained for the datasets that have undergone error repairs. Each successive iteration of the dataset, post-repair, is stored as a distinct version. This allows for a comprehensive historical record of the dataset's evolution and transformations over time. This tracking and versioning infrastructure helps ensure transparency, traceability, and reproducibility of data operations, thereby enhancing the reliability and verifiability of our data analysis processes.

Example Artifacts Tracking Techniques

Each time an error detection or repair operation is executed, the specific parameters and artifacts deployed in each unique method are logged and locally stored. This enables users to retrieve and review the operational details at their convenience. These parameters and artifacts are also incorporated into generated DataSheets, providing a comprehensive record of the data operations. Further details regarding these DataSheets are provided below. To streamline access and management, the runs are segmented into distinct groups, referred to as "experiments." These are specifically categorized under "Detection" and "Repair," offering a systematic and intuitive way to navigate through the logged operations. This structured approach enhances the user experience and promotes efficient data operations. The mLflow library, for example, may be used to facilitate the tracking of parameters and artifacts in certain example embodiments.

Example Data Version Control Techniques

Alongside experiment tracking, iterations of a dataset may be tracked with the assistance of the Delta Lake library. This library is built upon the delta-rs Rust library, providing a robust foundation for dataset versioning. Delta Lake is advantageous because of its simplicity in both setup and usage, particularly through its Python API. Delta Lake docs not necessitate preliminary setup requirements such as establishing a SQL connection, configuring a Kubernetes cluster, or initializing a Git repository. This straightforward approach reduces complexity and enhances user experience, making it an optimal choice for our dataset versioning needs. It will be appreciated, however, that other technologies may be used to track dataset iterations in different example embodiments.

Upon the initial upload of a dataset by the user, a Delta Lake is instantiated. This Delta Lake in essence serves as a repository for the dataset, housing all of the versions and transformations the dataset undergoes. The uploaded dataset is stored within this Delta Lake as a DeltaTable. A DeltaTable is a high-performance, format-agnostic, and schema-enforced collection of data, providing a structured and scalable framework for data storage. One of the key advantages of using a DeltaTable is its seamless interoperability with pandas DataFrames, facilitated by the methods provided by the Delta Lake library. It can be easily converted to a DataFrame for analysis and manipulation and, conversely, a DataFrame can be readily stored as a DeltaTable post-processing. This flexibility enhances the efficiency and versatility of data operations within our system.

If a DeltaTable already exists for a dataset from previous uploads, the user has the option to specify a version number during the dataset upload process. If the specified version number exists within the Delta Lake, the corresponding version of the dataset will be loaded for use. In scenarios where the indicated version does not exist, or the user does not provide a version number, the uploaded dataset will be stored as a new version within Delta Lake. Thus, previous versions are not erased or overwritten. Instead, each iteration of the dataset is preserved within the Delta Lake, maintaining a comprehensive record of dataset versions. This allows for historical tracking, comparison across versions, and the ability to revert to earlier versions if needed or desired, thereby enhancing the robustness and flexibility of the data management system.

Once a user executes an error repair method, the resultant repaired dataset is stored within the Delta Lake as a new, distinct version. This helps ensure that the dataset's progression through each error repair operation is precisely tracked, in turn helping to maintain a comprehensive record of the dataset's evolution. If a DataSheet is generated by the user, it will contain the version number of the dataset that was used for error detection, as well as the version number of the dataset post-repair. This information provides a clear reference of the dataset's status at various stages of the error detection and repair process. By incorporating these version numbers into the DataSheet, its utility as a comprehensive report of the data operations is enhanced.

It will be appreciated that other containers or groupings besides Delta Lake may be used in different example embodiments, provided that some representation of the repaired dataset associated with each respective iteration is stored.

Example DataSheet Generation Techniques

DataSheets can be produced once error detection and repair methods have been executed on the dataset. These DataSheets encapsulate a wealth of information about the methods employed and the state of the data and can be archived for future reference. For example, DataSheets compile an array of general details about the dataset, including the dataset's name, locations for both the original dirty dataset and the repaired dataset, the "shape" (number of rows and columns) of the dataset, the detection methods applied, the number of erroneous cells identified in the dataset, etc.

As discussed above, mLflow may be utilized to track the parameters used in the error detection and repair processes. This information is also retrieved and incorporated into the DataSheet. DataSheets are persisted in a structured format, such as a JSON format, providing a human-readable and highly interoperable data structure. An example JSON DataSheet structure is as follows:

```
{
    "dirty_path": string
    "repaired_path": string,
    "original_data_version": int,
    "repaired_data_version": int,
    "dataset_name": string
    "dataset_shape": [int, int],
    "error_detection_methods": [string],
    "error_repair_methods": [string],
    "error_count": int,
    "uiltags": [string],
    "error_detection_params": [
        {
            "error detection method 1": {
                parameters
            },
            "error detection method 2": {
                parameters
            },
            ...
        }
    ],
    "error_repair_params": [
        {
            "repair method": {
                parameters
            }
        }
    ],
    "errors": [[int, int]]
}
```

The errors identified during the data cleaning process are stored as tuples in the format of (row, column). Thus, each tuple represents the row and column indices of a detected error in the dataset. This concise and intuitive format allows for efficient storage and easy identification of the exact location of errors within the dataset. It also facilitates the process of error correction, as the specific cells requiring attention can be directly accessed using these indices. The design of DataSheets allows for easy access to key information about the state of the dataset and the operations performed on it, thereby enhancing transparency and reproducibility.

Example User-in-the-Loop Module Related Techniques

This section elaborates on the user-in-the-loop module which, as described above, facilitates user intervention with the data quality dashboard. As described above in connection with FIG. 1, the user-in-the-loop module comprises components for labeling, tagging, and rule engineering. First, the labeling component helps in providing the user with the functionality to annotate these selected data instances. ML-based error detection tools typically use a certain quantity of labeled data samples for successful training of the ML detection models. For instance, a tool like RAHA uses a number of labels that is at least 20 times the number of columns in the dataset to attain a detection accuracy exceeding 90%. As a result, ML-based error detection tools typically implement various strategies to select the most suitable data samples to be labeled by the user. When these selected instances are annotated by the user, the capability of the developed ML models to precisely segregate clean data from dirty data is enhanced.

The tagging component empowers users to leverage their existing knowledge about the datasets. For example, the user might already be aware that certain values (e.g., −1, 0, and 99999) within the dataset signify dirty data instances. In such scenarios, the dashboard provides an interface to enable the user to submit these values. Then, the system of certain example embodiments uses these tagged data instances as supplementary labels for the ML-based error detection tools. Furthermore, a comprehensive search within the dataset is performed for these specific values, and their respective indexes are appended to the detection list. This approach not only enhances the robustness of the ML models but also streamlines the process of dirty data identification.

The rule engineering component furnishes users with the capacity to validate and define FD rules and constraints. The rules that are automatically generated may necessitate validation in order to discard any irrelevant or imprecise directives. For example, automated rule generation tools might deduce a relationship between the zip code of a district and the count of cars within that district. In such scenarios, the user has the ability to confirm, rectify, or refute this inferred relationship. Moreover, certain example embodiments provide users with the flexibility to formulate additional rules that may not have been identified by the automated rule generation mechanisms. This enhances the adaptability and precision of the system, helping to ensure comprehensive data integrity checks.

Unlike some approaches for keeping a user in the review loop, the user-in-the-loop module of certain example embodiments enables a combination of user labeling, data tagging, and the engineering of FD rules. And it also includes a dual-validation system, which not only validates the automatically generated rules but also enables the creation and integration of custom user-defined rules. Current tools do not offer this combination of features, especially in this context. Certain example embodiments are able to learn from user interactions and improve over time, not merely a passive feature but rather as a core component of the system's architecture. This allows for a more granular level of control and customization compared to what is available in commercially available tools.

$$D_{r^*}^C$$

Example Iterative Cleaning Techniques

The iterative cleaning module performs consecutive cleaning operations with the objective of enhancing the performance of an ML model. If a user provides the type of the ML task (e.g., binary classification or regression) and the name of the attributes serving as labels, the iterative cleaning module of certain example embodiments embarks on a cycle of cleaning processes, employing a variety of cleaning tools. In so doing, certain example embodiments are able to automatically identify and apply the cleaning techniques that yield the greatest improvement in the model's predictive performance.

As its name implies, the iterative cleaning module of certain example embodiments operates in an iterative manner, continuously refining the dataset through various cleaning operations and evaluating the performance of the ML model with each iteration. The cleaning tools that contribute to the most significant performance enhancement are selected and applied. This methodology allows for the systematic improvement of the dataset's quality, leading to more accurate and reliable outputs from the ML model. By tailoring the cleaning process to the specific needs of the ML model, it becomes possible to effectively optimize the model's performance.

FIG. 7 is pseudo-code for an ML-oriented iterative cleaning algorithm, which may be implemented in accordance with certain example embodiments. FIG. 7 shows the inputs, processing steps, and the outputs for the algorithm. The FIG. 7 process begins by initializing a clean dataset, $D^c$, to be a copy of the original dirty dataset, $D^d$ (line 2). The algorithm then defines a search space S, which is the set of all possible combinations of error detectors from the provided list $E^u$ and repair tools from the list $R^u$ (line 3). Following this, a scoring function f(e, r) is defined to measure the performance of a given detector e and repair tool r on the clean dataset $D^c$ (line 4). By way of example, such a function can be defined as the root mean square error (RMSE) of the target ML model in the case of regression, and the F1 score of the ML model in case of classification.

The algorithm then enters an iterative process that will continue for a predetermined number of iterations $N_o$, or until the accuracy of the ML model $T_{ml}$ reaches a desired threshold $\alpha$ (lines 5-15). In each iteration, the algorithm first trains the ML model $T_{ml}$ on the current clean dataset and the given labels Y, and calculates the accuracy A of the model (lines 6-7). In certain example embodiments, the scoring function is used again for this particular error detector/repair tool combination. When evaluating a machine learning model that performs regression tasks, for example, the scoring function can be designated as the RMSE as noted above. This metric can be used to assess the model's performance, providing a measure of effectiveness for the error detection and repair combination in use. If the accuracy A is greater than or equal to the threshold $\alpha$, the algorithm terminates the iterative process (lines 8-10). If the accuracy is not satisfactory, the algorithm proceeds to identify the best detector e* and repair tool r* using Bayesian optimization on the search space S and the scoring function f (line 11). Once the best detector and repair tool have been identified, the detector e* is applied to the clean dataset to get the indices $I_{e^*}$ where errors are detected (line 12). The repair tool r* is then applied to the clean dataset at these indices, resulting in a repaired dataset (line 13). The clean dataset is then updated to be this repaired dataset (line 14). The iterative process continues until the desired model accuracy is achieved or the maximum number of iterations is reached. Finally, the algorithm outputs the cleaned dataset (line 16), ready for further use with the ML task $T_{ml}$. In other words, in each iteration, a specific workflow is carried out. The process begins with error detection via a designated tool, which is then followed by a data repair phase. Once the data is repaired, it undergoes preprocessing to organize features and labels, setting the stage for training and testing a selected machine learning model. With each subsequent iteration, this workflow is systematically repeated, employing various pairings of detection and repair tools. These may be thought of as being the "experiments" discussed earlier.

In the context of certain example embodiments, data cleaning tools may be conceptualized as hyperparameters. Certain example embodiments delineate the search space, encompassing all potential permutations of error detection and repair tools. This search space can be systematically navigated to ascertain the amalgamation of tools that yield the highest performance according to the predefined scoring function. This process may be driven by a sequential model-based optimization approach. In this regard, to execute Bayesian optimization, Optuna may be used. Optuna is an advanced hyperparameter optimization framework that facilitates the identification of optimal hyperparameters for ML models. Optuna thus may iteratively select the most promising hyperparameters to evaluate, based on the past trial outcomes, to efficiently converge on the optimal configuration.

Existing ML-oriented cleaning tools focus on sampling the best data batches which, if cleaned, enhance the downstream ML models. For example, ActiveClean, which is suitable for models with convex loss functions, treats data cleaning as a stochastic gradient descent task, iteratively updating a model trained on a dirty dataset by cleaning samples of records to guide the model towards a global minimum. The iterative cleaning approach of certain example embodiments instead uses Bayesian optimization to find the best cleaning tools to help optimize the target ML models. The Bayesian optimization involves a feedback mechanism where the system learns from previous iterations, effectively reducing the time and computational resources required for convergence.

As discussed above, the iterative cleaning module of certain example embodiments implement a Bayesian optimization algorithm using a tool such as, for example, Optuna. Bayesian optimization is used to select the best combination of cleaning tools and parameters that will likely maximize/minimize an "objective function." In the context of data cleaning, and in certain example embodiments, the "objective function" is the performance of the ML model on the repaired data. After each iteration of cleaning and evaluating the ML model, the performance of the ML model is fed back into the optimization algorithm.

In essence, the space of detection/repair combinations is modelled using a probabilistic model, and this model is used to make informed decisions about which detection/repair combination to try next. In certain example embodiments, two probabilistic models are created: one for detection/repair combinations that lead to better outcomes (the "good" set), and one for the rest (the "bad" set). The two models are used to calculate the ratio of the probability that a given detection/repair combination will fall into the "good" set to the probability that it will fall into the "bad" set. The detection/repair combinations with higher ratios are considered more promising. Based on this probability ratio, the algorithm selects new detection/repair combinations in subsequent iterations.

Based on the results obtained in each iteration, the probabilistic models are updated, refining their predictions for the detection/repair combinations space. The process repeats until a stopping criterion is met, which could be, for example, a maximum number of repetitions, predefined ratio being met, etc.

Bayesian optimization using a tool like Optuna may be particularly effective in some instances because it builds upon previous iterations to guide the search, making it more efficient compared to approaches like grid search or random search, especially when the number of detection/repair combinations is large. Moreover, the Optuna tool in particular offers a feature called "pruning," which stops unpromising iterations early, further increasing the efficiency of the optimization process.

Based on the above, it will be appreciated that certain example embodiments run multiple error detection algorithms sequentially, e.g., prior to one or more of the data repair approaches being implemented. In such cases, for example, a filtering or other process may be used to remove redundancies in the detected errors prior to the set of detected errors being provided to the error repair algorithm. Application of the error detection algorithms may generate a plurality of detected errors. Redundancies may be removed from the detected errors. Subsequently, once redundancies have been eliminated, the refined detections serve as input to one or several data repair tools, which are employed to correct the identified instances of erroneous data. A reinforcement learning or other approach may be used to help resolve conflicts between error different detectors (e.g., where one indicates an error and the other indicates a non-error), and/or conflicts between data repair algorithms (e.g., where different repair algorithms indicate that different repairs should be made). See, for example, U.S. application Ser. No. 18/134,913 filed on Apr. 14, 2023, the entire contents of which are hereby incorporated herein by reference.

The sequential application approach is advantageous because individual error detectors typically cannot predict with 100% precision and recall. That is, individual error detectors typically operate on a limited scope, e.g., detecting of certain kinds of errors, detecting errors well within only a given domain, etc. The sequential application approach enables a broader swath of potential errors to be identified, e.g., compared to running just one error detector over several iterations. This approach makes the error detection more effective in terms of detection accuracy. The removal of duplicated detections helps improve efficiency by avoiding redundant inputs to the error repair algorithms(s). Thus, less time and/or fewer processing resources can be spent on error repair operations, providing further technical advantages.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A machine learning (ML) model dataset preparation method for use with a system having access to a plurality of error detection algorithms, a plurality of data repair algorithms, and an ML model, the method comprising:
   (a) accessing a dirty dataset from a data store;
   (b) initializing a clean dataset to the accessed dirty dataset;
   (c) defining a search space as a set of all possible combinations of the plurality of error detection algorithms and the plurality of data repair algorithms, wherein a scoring function is defined to measure performance of a given error detection algorithm and data repair algorithm combination on the clean dataset;
   (d) training the ML model using the clean dataset;
   (e) selecting a best error detection algorithm and selecting a best data repair algorithm, based on an optimization on (i) the search space and (ii) the defined scoring function;
   (f) applying the selected best error detection algorithm to the clean dataset;
   (g) generating a repaired dataset by applying the selected best data repair algorithm to the clean dataset;
   (h) setting the clean dataset to the repaired dataset;
   (i) repeating (d) through (h) until a condition is met; and
   (j) outputting the cleaned dataset.

2. The method of claim 1, wherein the training in (d) includes training the ML model using the clean dataset and a plurality of labels.

3. The method of claim 1, wherein the scoring function includes a root mean square error (RMSE) calculation and/or a F1 score.

4. The method of claim 1, wherein the optimization is Bayesian optimization.

5. The method of claim 1, wherein (d) through (h) are performable up to a predetermined number of repetitions.

6. The method of claim 5, further comprising computing accuracy of the trained ML model with each repetition following (d) and prior to (i).

7. The method of claim 6, wherein further repetitions cease provided that the computed accuracy exceeds a predetermined threshold.

8. The method of claim 1, wherein the cleaned dataset output in (j) is used as training data.

9. The method of claim 1, wherein the dirty dataset is accessed from a file and/or a database.

10. The method of claim 1, wherein the plurality of error detection algorithms and the plurality of data repair algorithms are implemented in software modules external to the system.

11. The method of claim 10, wherein the software modules are accessible by API calls.

12. The method of claim 1, further comprising receiving a user selection, wherein the set of all possible combinations of the plurality of error detection algorithms and the plurality of data repair algorithms is limited by the received user selection.

13. The method of claim 1, further comprising storing parameters of the selected best error detection algorithm and the selected best data repair algorithm associated with each respective repetition.

14. The method of claim 13, further comprising storing a representation of the repaired dataset associated with each respective repetition.

15. The method of claim 1, wherein the repetition includes iteratively cleaning the dirty dataset from the data store, and further comprising, for each repetition:

storing to a structured data type information about the selected best error detection algorithm and the selected best data repair algorithm for the respective repetition, including an identification of the selected best error detection algorithm and the selected best data repair algorithm for the respective repetition and used parameters and artifacts.

16. The method of claim 1, wherein the error detection algorithms comprise automatically generated error detection rules and user-defined error detection rules.

17. The method of claim 1, further comprising enabling a user to tag dirty values.

18. The method of claim 1, wherein at least some of the plurality of error detection algorithms are run sequentially within a single repetition of (d) through (h), prior to one of the plurality of data repair algorithms being implemented.

19. The method of claim 18, wherein application of the error detection algorithms generates a plurality of detected errors, the method further comprising removing redundancies from the detected errors.

20. A non-transitory computer readable storage medium storing instructions that, when executed, cause a processor of a system having access to a plurality of error detection algorithms, a plurality of data repair algorithms, and an ML model, to perform operations comprising:

(a) accessing a dirty dataset from a data store;

(b) initializing a clean dataset to the accessed dirty dataset;

(c) defining a search space as a set of all possible combinations of the plurality of error detection algorithms and the plurality of data repair algorithms, wherein a scoring function is defined to measure performance of a given error detection algorithm and data repair algorithm combination on the clean dataset;

(d) training the ML model using the clean dataset;

(e) selecting a best error detection algorithm and selecting a best data repair algorithm, based on an optimization on (i) the search space and (ii) the defined scoring function;

(f) applying the selected best error detection algorithm to the clean dataset;

(g) generating a repaired dataset by applying the selected best data repair algorithm to the clean dataset;

(h) setting the clean dataset to the repaired dataset;

(i) repeating (d) through (h) until a condition is met; and (j) outputting the cleaned dataset.

21. The non-transitory computer readable storage medium of claim 20, wherein the optimization is Bayesian optimization.

22. The non-transitory computer readable storage medium of claim 20, wherein:

(d) through (h) are performable up to a predetermined number of repetitions;

accuracy of the trained ML model is computed with each repetition following (d) and prior to (i); and further repetitions cease provided that the computed accuracy exceeds a predetermined threshold.

23. The non-transitory computer readable storage medium of claim 20, wherein the set of all possible combinations of the plurality of error detection algorithms and the plurality of data repair algorithms is limited based on a user selection of at least one error detection algorithm.

24. The non-transitory computer readable storage medium of claim 20, wherein the repetition includes iteratively cleaning the dirty dataset from the data store, and for each repetition: information about the selected best error detection algorithm and the selected best data repair algorithm for the respective repetition is stored to a structured data type, the information including an identification of the selected best error detection algorithm and the selected best data repair algorithm for the respective repetition and used parameters and artifacts.

25. A machine learning (ML) model dataset preparation system having access to a plurality of error detection algorithms, a plurality of data repair algorithms, and an ML model, the system comprising:

a data store storing a dirty dataset;

a memory and at least one processor configured to execute instructions stored in the memory to perform operations comprising:

(a) initializing a clean dataset to the dirty dataset;

(b) defining a search space as a set of all possible combinations of the plurality of error detection algorithms and the plurality of data repair algorithms, wherein a scoring function is defined to measure performance of a given error detection algorithm and data repair algorithm combination on the clean dataset;

(c) training the ML model using the clean dataset;

(d) selecting a best error detection algorithm and selecting a best data repair algorithm, based on an optimization on (i) the search space and (ii) the defined scoring function;

(e) applying the selected best error detection algorithm to the clean dataset;

(g) generating a repaired dataset by applying the selected best data repair algorithm to the clean dataset;

(g) setting the clean dataset to the repaired dataset;

(h) repeating (c) through (g) until a condition is met; and (i) outputting the cleaned dataset.

26. The system of claim 25, wherein the optimization is Bayesian optimization.

27. The system of claim 25, wherein:

(c) through (g) are performable up to a predetermined number of repetitions;

accuracy of the trained ML model is computed with each repetition following (c) and prior to (h); and further repetitions cease provided that the computed accuracy exceeds a predetermined threshold.

28. The system of claim 25, wherein the set of all possible combinations of the plurality of error detection algorithms and the plurality of data repair algorithms is limited based on a user selection of at least one error detection algorithm.

29. The system of claim 25, wherein the repetition includes iteratively cleaning the dirty dataset from the data store, and for each repetition: information about the selected best error detection algorithm and the selected best data repair algorithm for the respective repetition is stored to a structured data type, the information including an identification of the selected best error detection algorithm and the selected best data repair algorithm for the respective repetition and used parameters and artifacts.

* * * * *